United States Patent
Hong et al.

(10) Patent No.: US 10,468,687 B2
(45) Date of Patent: Nov. 5, 2019

(54) METHOD OF MANUFACTURING ELECTRODE FOR FUEL CELLS WITH ENHANCED FREEZING RESISTANCE

(71) Applicants: Hyundai Motor Company, Seoul (KR); Kia Motors Corporation, Seoul (KR)

(72) Inventors: Bo Ki Hong, Seoul (KR); Jong Kil Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 93 days.

(21) Appl. No.: 15/692,001

(22) Filed: Aug. 31, 2017

(65) Prior Publication Data
US 2018/0175394 A1    Jun. 21, 2018

(30) Foreign Application Priority Data
Dec. 19, 2016    (KR) .................... 10-2016-0173559

(51) Int. Cl.
| | |
|---|---|
| *H01M 4/88* | (2006.01) |
| *H01M 8/1004* | (2016.01) |
| *H01M 8/04223* | (2016.01) |
| *H01M 4/86* | (2006.01) |

(Continued)

(52) U.S. Cl.
CPC ....... *H01M 4/8814* (2013.01); *H01M 4/8605* (2013.01); *H01M 4/8828* (2013.01); *H01M 4/8882* (2013.01); *H01M 4/926* (2013.01); *H01M 8/04253* (2013.01); *H01M 8/1004* (2013.01); *H01M 2008/1095* (2013.01);

(Continued)

(58) Field of Classification Search
CPC ..... H01M 2008/1095; H01M 2250/20; H01M 4/8605; H01M 4/8814; H01M 4/8828; H01M 4/8882; H01M 4/926; H01M 8/04253; H01M 8/1004; Y02E 60/521; Y02P 70/56; Y02T 90/32
USPC .................................... 156/230, 289
See application file for complete search history.

(56) References Cited

U.S. PATENT DOCUMENTS

| | | | |
|---|---|---|---|
| 6,524,736 B1 * | 2/2003 | Sompalli ............... | C25B 9/10 427/115 |
| 2008/0020261 A1 * | 1/2008 | Hendricks ........... | H01M 4/8636 429/431 |
| 2008/0241608 A1 | 10/2008 | Zhang et al. | |

(Continued)

FOREIGN PATENT DOCUMENTS

| | | |
|---|---|---|
| KR | 10-0802749 | 2/2008 |
| KR | 10-1637711 | 7/2016 |

OTHER PUBLICATIONS

English translation of KR101637711.*
English translation of KR10082749.*

*Primary Examiner* — Sonya M Sengupta
(74) *Attorney, Agent, or Firm* — Mintz Levin Cohn Ferris Glovsky and Popeo, P.C.; Peter F. Corless (57) ABSTRACT

A method for improving freezing resistance of a membrane electrode assembly is provided. In particular, the method improves freezing resistance of a membrane electrode assembly including conducting drying and heat treatment under certain conditions to produce an electrode that reduces formation of macro-cracks and micro-cracks in the electrode. Accordingly, water does not permeate the electrode excessively and the electrode does not break even when frozen.

10 Claims, 6 Drawing Sheets

(51) Int. Cl.
  *H01M 4/92* (2006.01)
  *H01M 8/1018* (2016.01)
(52) U.S. Cl.
  CPC ........ *H01M 2250/20* (2013.01); *Y02E 60/521* (2013.01); *Y02P 70/56* (2015.11); *Y02T 90/32* (2013.01)

(56) References Cited

U.S. PATENT DOCUMENTS

2010/0143813 A1 6/2010 Goebel et al.
2016/0126577 A1* 5/2016 Hong .................. H01M 8/1004 264/28
2018/0277872 A1* 9/2018 Hong .................. H01M 8/1004

* cited by examiner

| Item | (a) Comparative Example 3 | (b) Example 3 | (c) Example 4 |
|---|---|---|---|
| | No high-temperature heat-treatment | Heat-treatment at high-temperature of 100°C | Heat-treatment at high-temperature of 120°C |
| Electrode(100) adhered to ice | Ice   Electrode | Ice   Electrode | Ice   Electrode |
| Decal transfer film(10) separated from electrode specimen(100) | Decal transfer film | Electrode   Decal transfer film | Decal transfer film   Electrode |

FIG. 7

| Item | (a) Comparative Example 4 | (b) Example 5 | (c) Example 6 |
|---|---|---|---|
| | No high-temperature heat-treatment | Heat-treatment at high-temperature of 100°C | heat-treatment at high-temperature of 120°C |
| Electrode(100) adhered to ice |  |  |  |
| Decal transfer film(10) separated from electrode specimen (100) |  |  |  |

FIG. 8

METHOD OF MANUFACTURING ELECTRODE FOR FUEL CELLS WITH ENHANCED FREEZING RESISTANCE

CROSS-REFERENCE TO RELATED APPLICATION

This application claims under 35 U.S.C. § 119(a) the benefit of priority to Korean Patent Application No. 10-2016-0173559 filed on Dec. 19, 2016, the entire contents of which are incorporated herein by reference.

BACKGROUND (a) Technical Field

The present disclosure relates to a method for improving freezing resistance of a membrane electrode assembly, and more particularly, to manufacturing a membrane electrode assembly including conducting drying and heat treatment to minimize the formation of macro-cracks and micro-cracks in the electrode which reduces water permeation of the electrode.

(b) Background Art

Generally, polymer electrolyte membrane fuel cells (PEMFCs) are used as fuel cells for vehicles. In particular, for PEMFCs to normally exert a high power of at least several tens of kW, the fuel cells should stably operate within a wide current density range. The reaction of the fuel cell to generate electricity occurs in a membrane electrode assembly (MEA) including an electrolyte membrane and electrodes consisting of an anode and a cathode. Hydrogen supplied to the anode, which is an oxidation electrode of the fuel cell, is split into a proton and an electron. The proton moves via the electrolyte membrane to the cathode (e.g., a reduction electrode) and the electron moves via an exterior circuit to the cathode.

An oxygen molecule, the proton and the electron react with one another at the cathode. Electricity and heat are simultaneously produced and water ($H_2O$) is produced as a by-product. When water produced by electrochemical reaction in the fuel cell is present in an appropriate amount, the water maintains humidification of the membrane electrode assembly. However, when water is excessively produced but is not adequately removed, flooding occurs at a high current density. The flood water prevents reactive gases from being effectively supplied into the fuel cell, thus causing voltage loss.

In addition, water that permeates into the electrode may freeze and the electrode may fracture at a temperature less than zero degrees Celsius. Thus, to stably operate electric vehicles using fuel cells (fuel cell electric vehicles, FCEVs) during extreme temperatures, resistance to formation and growth of fuel cells at a temperature below zero degrees Celsius should be sufficiently enhanced. Accordingly, it is important to improve freezing resistance of an electrode in the membrane electrode assembly having poor freezing resistance. Accordingly, a demand exists for development of methods that are simpler and effectively improve freezing resistance.

The above information disclosed in this section is merely for enhancement of understanding of the background of the disclosure and therefore it may contain information that does not form the related art that is already known in this country to a person of ordinary skill in the art.

SUMMARY

The present disclosure provides a method of manufacturing an electrode for fuel cells with improved freezing resistance and a membrane electrode assembly including the electrode manufactured by the method. In addition, the present disclosure provides a method of manufacturing an electrode for fuel cells that minimizes an electrode fracture caused by freezing of water in a fuel cell.

In one aspect, the present disclosure provides a method of manufacturing an electrode for fuel cells with improved freezing resistance that may include applying a catalytic ink to a decal transfer film to prepare an electrode specimen, primarily drying the electrode specimen at a moderate temperature and secondarily drying the electrode specimen at a temperature that is less than the moderate temperature and heat-treating the electrode. The catalytic ink may include a platinum catalyst supported on a carbon support (Pt/C) and an ionomer binder. The ionomer binder may be present in an amount in the range of about 10% by weight to about 50% by weight in a solid-phase electrode obtained by applying the catalytic ink to the decal transfer film and drying the same.

The application of the catalytic ink to the decal transfer film may be performed to include loading of the platinum catalyst within the range of about 0.01 mg-Pt/cm² to about 1 mg-Pt/cm². The primary drying of the electrode specimen may be performed within the range of about 70° C. to about 90° C. for duration in a range of about 1 minute to about 6 hours. The secondary drying of the electrode specimen may be performed at a temperature in the range of greater than 0° C. and less than about 70° C. The primary drying and secondary drying may be performed under atmospheric pressure conditions.

The heat treatment may be performed under a vacuum condition or under an inert gas atmosphere within a range of about 100° C. to about 125° C. for a duration of about 10 minutes to about 3 hours. The decal transfer film may be selected from a group consisting of poly(tetrafluoroethylene) (PTFE), poly(ethylene terephthalate) (PET), polybutylene terephthalate) (PBT), poly(trimethylene terephthalate) (PTT), poly(ethylene naphthalate) (PEN) and polyimide (PI), or a combination thereof.

In another aspect, the present disclosure provides a method of manufacturing a membrane electrode assembly for fuel cells with improved freezing resistance that may include transferring the decal transfer film provided with the electrode specimen according to claim 1 to at least one surface of an electrolyte membrane to form a membrane electrode assembly.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various exemplary embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The method of manufacturing an electrode for fuel cells with improved freezing resistance may include applying a catalytic ink to a decal transfer film to prepare an electrode specimen, primarily drying the electrode specimen at a moderate temperature and secondarily drying the electrode specimen at a temperature less than the moderate temperate and heat-treating the electrode specimen. In addition, the method of manufacturing an electrode for fuel cells with improved freezing resistance may further include transferring the electrode specimen-formed decal transfer film to at least one surface of the electrolyte membrane to form a membrane electrode assembly.

The method may include applying a catalytic ink to a decal transfer film to prepare an electrode specimen. The catalytic ink may be prepared by mixing a platinum catalyst on a carbon support (Pt/C) and an ionomer binder with solvents (e.g., deionized water and isopropyl alcohol), followed by stirring and ultra-sonication. The platinum catalyst supported on the carbon support may be a platinum catalyst supported in an amount of within the range of about 20% by weight to 60% by weight on a carbon support.

The ionomer binder may be a perfluorinated sulfonic acid-based ionomer dispersion, but is not limited thereto. In addition, the ionomer binder may be contained in an amount within the range of about 10% by weight to 50% by weight in a dried solid-phase electrode obtained by coating the catalytic ink on the decal transfer film and drying. When the content of the ionomer binder is about 10% by weight or greater, the ionomer binder may connect the catalyst-supported carbon support in the form of a three-dimensional network structure and bind the same. When the content of the ionomer binder is about 50% by weight or less, the ionomer binder may avoid an excessive water saturation (e.g., flooding) of the electrode.

A solid content may be derived from the platinum catalyst supported on a carbon support and the ionomer binder in the catalytic ink. For example, when mixing the platinum catalyst supported on a carbon support and the ionomer binder with the solvent as a catalytic ink, the solid content, i.e., {(Pt/C+ionomer binder contents)/catalytic ink content}*100, may be within the range of about 5% by weight to 20% by weight, specifically within the range of about 5% by weight to 15% by weight, specifically 10% by weight. In addition, the solvent may be prepared by mixing deionized water with isopropyl alcohol to adjust the content of alcohol to within the range of about 15% by weight to 30% by weight, specifically 20% by weight to 25% by weight.

The decal transfer film may be selected from a group consisting of poly(tetrafluoroethylene) (PTFE), poly(ethylene terephthalate) (PET), polybutylene terephthalate) (PBT), poly(trimethylene terephthalate) (PTT), poly(ethylene naphthalate) (PEN) and polyimide (PI), which exhibit improved mechanical properties and more improved removability from the electrode upon producing a membrane electrode assembly by hot pressing or roll lamination, or a combination thereof. The preparation of the electrode specimen may be performed by adjusting the amount or thickness of catalytic ink applied to adjust platinum catalyst loading (Pt catalyst loading) in the electrode formed after drying the electrode specimen and heat treatment within a range of about 0.01 mg-Pt/cm$^2$ to 1 mg-Pt/cm$^2$, (e.g., specifically 0.05 to 0.5 mg-Pt/cm$^2$). The platinum catalyst loading may be about 0.01 mg-Pt/cm$^2$ or greater to uniformly coat the catalytic ink on the decal transfer film and prevent fracture of the electrode when transferring the electrode on the decal transfer film to the electrolyte membrane. In addition, the platinum catalyst loading may be about 1 mg-Pt/cm$^2$ or less to provide desirable fuel cell performance and effects compared to loading and thus offer better economic efficiency.

Figure 1A:
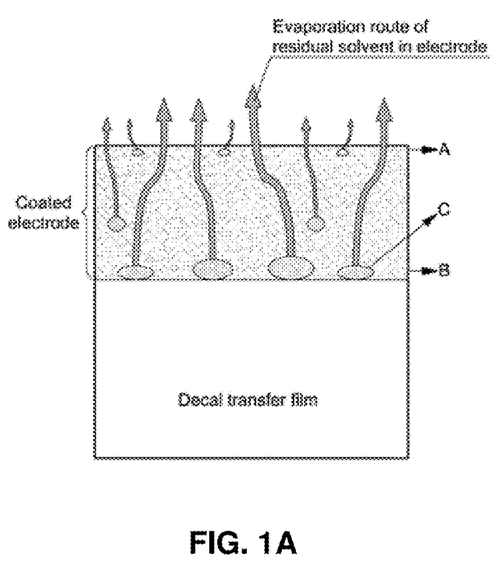
FIG. 1A shows an example of a process of macro-crack occurrence caused by evaporation of a solvent during drying on an electrode specimen according to an exemplary embodiment of the present disclosure.
Figure 1B:
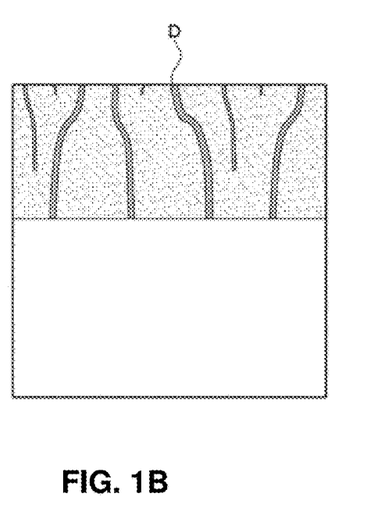
FIG. 1B shows an example of a process of macro-crack formation on the electrode specimen after drying according to an exemplary embodiment of the present disclosure.

One technical feature of the present disclosure is to improve freezing resistance of the electrode by drying the electrode specimen prepared as described above in a certain order under given conditions. For example, heat-treating the electrode specimen prevents formation or occurrence of macro-cracks, pores and micro-cracks on the electrode. Hereinafter, this will be described in detailed. The present disclosure prevents formation or occurrence of macro-cracks on the electrode by primarily drying the electrode specimen at a moderate temperature and then secondarily drying the same at a temperature that is less than the moderate temperature. FIG. 1 illustrates a process of macro-crack formation upon drying an electrode.

As described above, when a catalytic ink is applied (e.g., or coated) to a decal transfer film and dried, as shown in FIG. 1A, the solvent present in an upper portion A of the electrode directly contacting an air layer may be dried first and the solvent present in a lower portion B of the electrode that directly contacts the decal transfer film may be dried after drying the solvent present in the upper portion A. Accordingly, the upper portion A of the electrode is dried and simultaneously, the amount of the residual solvent C present in the lower portion B of the electrode gradually increases. In particular, the residual solvent C evaporates out of the dried upper portion A of the electrode which causes macro-cracks D and pores to be created, as shown in FIG. 1B.

Fine pores with a size of several tens of nanometer (nm) to several hundreds of nanometer (nm) well organized in the electrode minimize the negative impact on mechanical properties and freezing resistance of the electrode and of facilitating transfer of reactive gases and product water. Further, since macro-cracks with a size of several micrometer (μm) to several tens of micrometer (μm) significantly deteriorate mechanical properties and freezing resistance of the electrode, formation of macro-cracks should be inhibited. Accordingly, to inhibit formation of macro-cracks or the like, optimization of drying conditions is required.

The technical feature of the present disclosure may primarily dry the electrode specimen within a range of 70° C. to 90° C. for a duration within a range of about 1 minute to 6 hours and secondarily dry the same at a temperature greater than 0° C. and less than 70° C. The primary drying and secondary drying may be conducted under normal or atmospheric pressure conditions.

By conducting the primary drying at a moderate temperature within a range of about 70° C. to 90° C., the solvent present on the upper portion of the electrode and the solvent present in the lower portion of the electrode may be evaporated simultaneously and creation of excessive residual solvent in the lower portion of the electrode may be prevented. When the primary drying temperature exceeds about 90° C., however, the solvent rapidly evaporates and thus, it may be difficult for constituent elements in the electrode to form a stable structure and the ionomer binder may be thermally decomposed.

Conversely, when the primary drying temperature is less than about 70° C., the effectiveness of the primary drying process may be negligible. In addition, the primary drying may be conducted for a duration in the range of about 1 minute to 6 hours (e.g., specifically 1 hour to 4 hours, more specifically for 2 hours). When the primary drying time is less than 6 hours, the solvent may be evaporated without thermal decomposition of the ionomer binder. The primary drying time may be greater than about 1 minute to gain substantial drying effects.

By conducting the secondary drying at a temperature within in a range greater than 0° C. and less than about 70° C., (e.g., specifically 10° C. to 50° C., more specifically at a temperature of 25° C.), the solvent in the electrode specimen may be completely removed. Since the secondary drying is conducted at a low temperature, drying time is not particularly limited and may be suitably adjusted based on temperature. When the drying is conducted at about 25° C., the electrode may be stored until heat treatment is conducted.

The primary drying and secondary drying may be conducted under normal or atmospheric pressure conditions. The drying under normal pressure conditions may be suitable for drying an increased amount of solvent since vacuum drying is inconvenient due to the necessity of an additional device such as a vacuum chamber and a solvent collection container. When the electrode specimen is subjected to moderate-temperature drying and then low-temperature drying, formation of macro-cracks may be prevented and freezing resistance of an electrode and a membrane electrode assembly including the same may be improved. To use the fuel cell for vehicles, durability for a period of at least 10 years should be provided and further improvement in freezing resistance is required.

Another technical feature of the present disclosure is to thermally anneal or heat-treat the dried electrode specimen at an elevated temperature and thereby connect or fill fine pores, micro-cracks and the like. For example, the fine pores or the micro-cracks may otherwise provide undesirable spaces for ice to form and grow in the electrode, via an ionomer binder.

The heat treatment may be conducted within a range of about 100° C. to 125° C. for a duration of about 10 minutes to 3 hours. When heat treatment temperature is about 100°

C. or greater, the ionomer binder may effectively fill vacant spaces (e.g., fine pores and micro-cracks). The heat treatment temperature may be about 125° C. or less to prevent the ionomer binder from being thermally decomposed. In addition, the heat treatment time may be about 10 minutes or greater for the ionomer binder to effectively fill vacant spaces (e.g., fine pores and micro-cracks). Further, heat treatment time may be about 3 hours or less to prevent thermal decomposition of the ionomer binder. The heat treatment may be conducted under a vacuum condition or an inert gas atmosphere (e.g., nitrogen ($N_2$), argon (Ar) or helium (He)), rather than under air in the atmosphere containing a substantial amount of oxygen. When heat treatment is conducted under the air, the ionomer binder may be thermally decomposed by an oxygen-containing radical (e.g., a hydroxyl radical) and physical properties of the electrode may deteriorate.

The method according to the present disclosure may include transferring the electrode specimen-formed decal transfer film which underwent the afore-mentioned steps to at least one surface of the electrolyte membrane to form a membrane electrode assembly derived from the electrode specimen. Accordingly, the membrane electrode assembly may include the electrolyte membrane and electrodes of an anode and a cathode.

Hereinafter, the present disclosure will be described in more detail with reference to examples. However, the examples are provided only for illustration of the present disclosure and should not be interpreted as limiting the scope of the present disclosure. To prove that drying inhibits creation or formation of the macro-cracks and improves freezing resistance as described above, electrode specimens were produced in accordance with the following Example 1, Example 2, Comparative Example 1 and Comparative Example 2.

EXAMPLE 1

Preparation of Catalytic Ink

A catalytic ink was prepared in accordance with the following conditions and methods. The Pt/C catalyst (HISPEC 4000, Johnson Matthey Co., UK) used herein was a platinum catalyst present in an amount of 40% by weight on a carbon support. A perfluorinated sulfonic acid-based Nafion ionomer (Nafion D2021, 20 wt % dispersion, equivalent weight=1100, DuPont, USA) was used as an ionomer binder. The content of the ionomer binder in a dried solid-phase electrode was adjusted to 30% by weight.

A platinum catalyst supported on a carbon support and an ionomer binder were mixed with a mixed solvent of deionized water and isopropyl alcohol such that a solid content in a catalytic ink was adjusted to about 10% by weight. The alcohol content of the mixed solvent was adjusted to 20% by weight. The mixture was stirred at room temperature for about 1 day with a stirrer (WiseStir Daihan Scientific Co., Korea). At this time, ultra-sonication for 1 hour was performed to the catalytic ink three times a day using an ultra-sonication device (3510E-DTH, Bransonic Ultrasonics Cor., USA) while stirring.

Production of Electrode Specimen

The catalytic ink was applied to a decal transfer film using a bar coater to produce an electrode specimen. At this time, platinum catalyst loading in the electrode was adjusted to 0.4 mg-Pt/cm² and the decal transfer film used was a polyimide film (Kapton HN, DuPont, USA).

Drying of Electrode Specimen

The electrode specimen was produced by applying the catalytic ink to the decal transfer film. Primary drying was conducted at a moderate temperature of about 80° C. for about 2 hours. Then, secondary drying was conducted at a low temperature of about 25° C. and then stored at a low temperature (25° C.).

EXAMPLE 2

An electrode specimen was obtained using the same composition and in the same manner as in Example 1, with the exception that an alcohol content of the mixed solvent was adjusted to 25% by weight.

COMPARATIVE EXAMPLE 1

An electrode specimen was obtained using the same composition and in the same manner as in Example 1, with the exception of an adjustment of the drying conditions. In particular, when a catalytic ink was applied to a decal transfer film to form an electrode specimen, the electrode specimen was dried at a low temperature of about 25° C. for 2 hours and then at a moderate temperature of about 80° C. for 2 hours. In other words, unlike Example 1, primary drying was conducted at a low temperature and secondary drying was conducted at a moderate temperature.

COMPARATIVE EXAMPLE 2

An electrode specimen was obtained using the same composition and in the same manner as in Comparative Example 1, with the exception of an adjustment of an alcohol content of the mixed solvent that was adjusted to 25% by weight.

TEST EXAMPLE 1

Figure 2A:
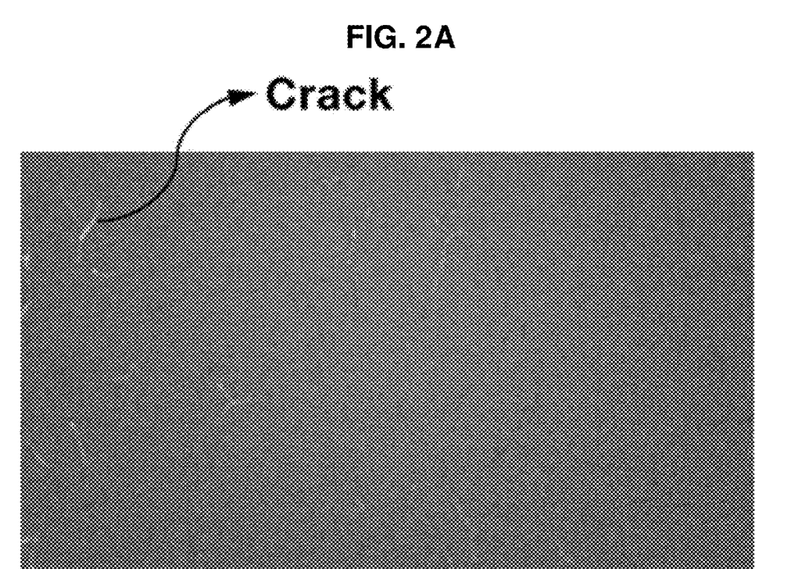
FIG. 2A shows an example result of observation of the surface of an electrode specimen of Comparative Example 1 at a magnification of 50× by optical microscopy according to an exemplary embodiment of the present disclosure.
Figure 2B:
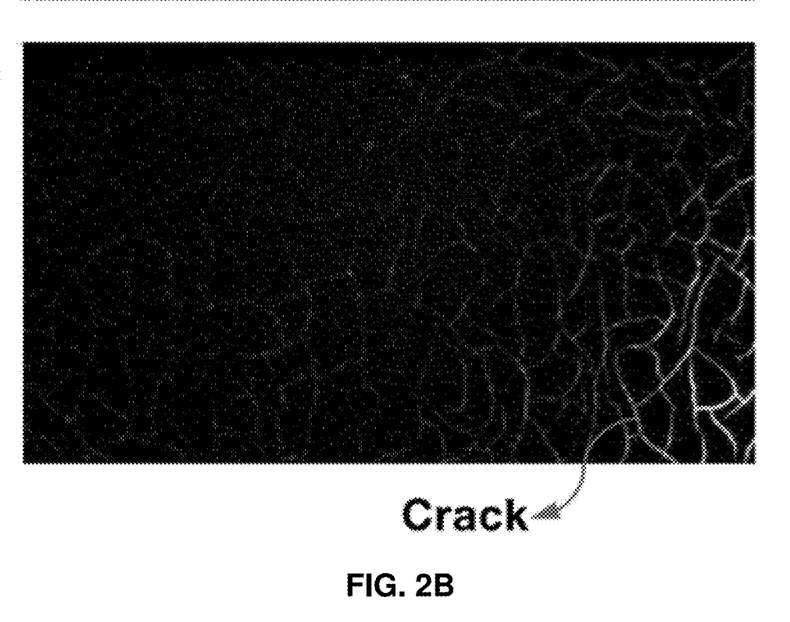
FIG. 2B shows an example result of observation of the surface of an electrode specimen of Comparative Example 2 at a magnification of 50× by optical microscopy according to an exemplary embodiment of the present disclosure.
Figure 3A:
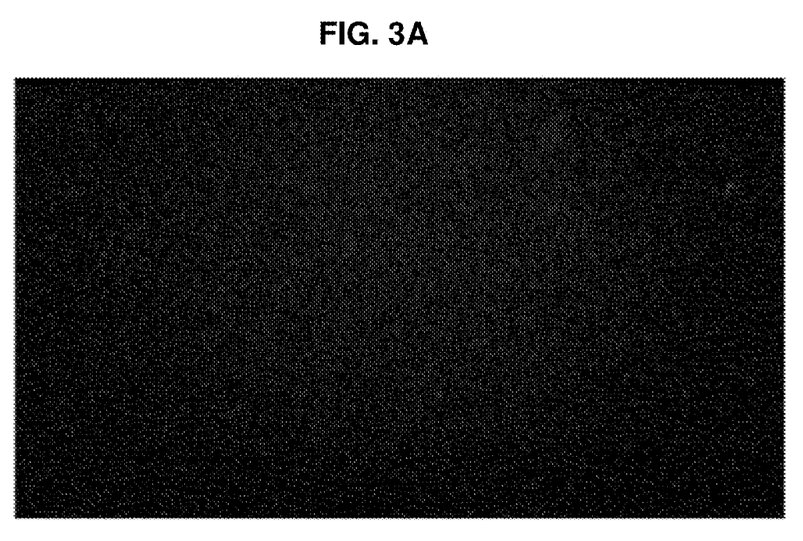
FIG. 3A shows an example result of observation of the surface of an electrode specimen of Example 1 at a magnification of 50× by optical microscopy according to an exemplary embodiment of the present disclosure.
Figure 3B:
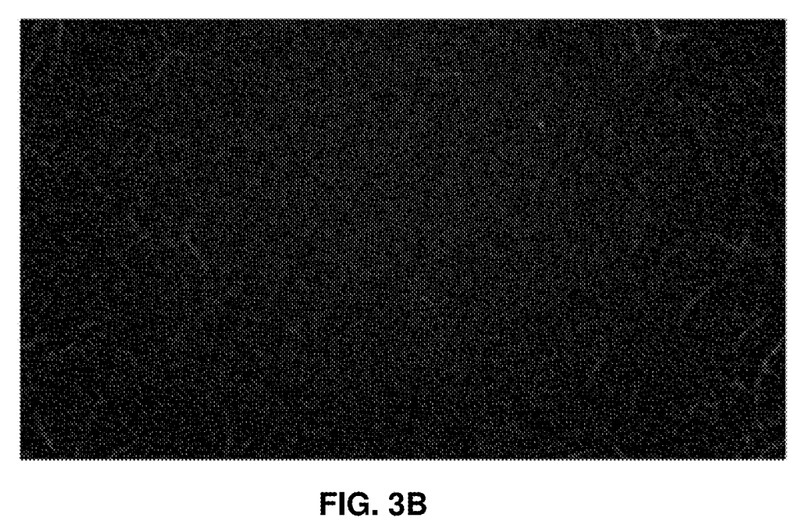
FIG. 3B shows an example result of observation of the surface of an electrode specimen of Example 2 at a magnification of 50× by optical microscopy according to an exemplary embodiment of the present disclosure.

The surfaces of electrode specimens obtained in Comparative Examples 1 and 2 were observed at a magnification of 50× with an optical microscope. Results are shown in FIG. 2. The surfaces of electrode specimens obtained in Examples 1 and 2 were observed at a magnification of 50× with an optical microscope. Results are shown in FIG. 3.

FIG. 2A shows exemplary results of Comparative Example 1 and FIG. 2B shows exemplary results of Comparative Example 2. As shown in FIGS. 2A and 2B, numerous macro-cracks are formed on the surfaces of the electrode specimens. FIG. 3A shows exemplary results of Example 1. FIG. 3B shows exemplary results of Example 2. As shown in FIGS. 3A and 3B, macro-crack formation on the surfaces of the electrode specimens is significantly reduced.

When primary drying is conducted at a low temperature and secondary drying is conducted at a moderate temperature (Comparative Examples 1 and 2), the residual solvent in the lower portion of the electrode evaporates from the upper portion of the dried electrode due to significant difference in solvent evaporation rate between the upper portion of the electrode and the lower portion of the electrode. Accordingly, numerous macro-cracks are formed. Conversely, when primary drying is conducted at a moderate temperature and secondary drying is conducted at a temperature less than the moderate temperature (Examples 1 and 2), macro-crack formation is significantly reduced due to no difference in solvent evaporation rate.

TEST EXAMPLE 2

To evaluate freezing resistance of electrode specimens obtained in Example 1, Example 2, Comparative Example 1 and Comparative Example 2, the following electrode separation test was conducted. The test method will be described in brief.

Figure 4:
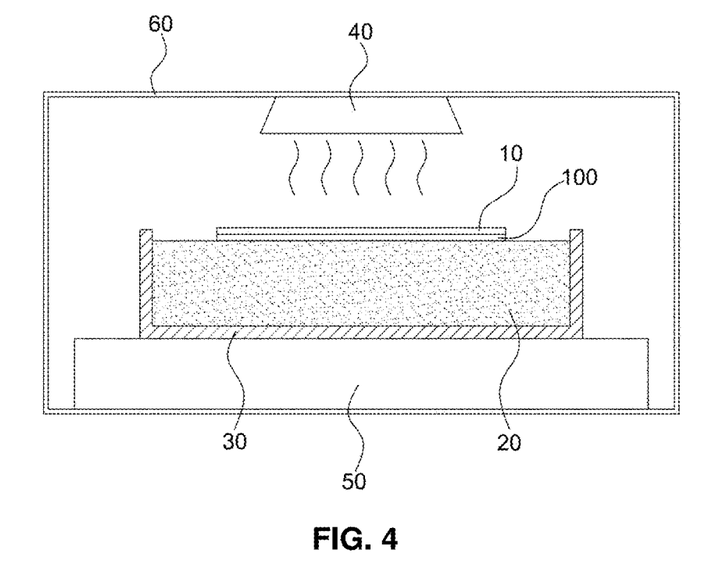
FIG. 4 shows an exemplary electrode-separating device based on freezing used in Test Examples 2 and 3 according to an exemplary embodiment of the present disclosure.

The electrode separation test was conducted with an electrode-separating device based on freezing, as shown in FIG. 4. The electrode-separating device based on freezing includes a decal transfer film 10, an electrode specimen 100, deionized water 20 well bound to an ionomer binder in the electrode specimen, a specimen tester 30 containing the deionized water, an electrode floating in deionized water of the specimen tester, and a freezing device 40 for freezing the deionized water and the like. In addition, the electrode-separating device based on freezing may further include a vibration-reducing support 50 for minimizing vibration occurring upon freezing to alleviate damage of the electrode specimen and an enclosure 60 for preventing permeation of exterior contaminants.

The freezing resistance was evaluated in the following manner. The electrode specimen floated on deionized water and then was sufficiently soaked therein for 24 hours to provide for the electrode specimen formed on the decal transfer film to directly contact the surface of deionized water (e.g., electrode on water surface, EOWS). Then, the electrode specimen was frozen at a temperature less than zero degrees Celsius for 6 hours and was then separated from the decal transfer film. The electrode specimen was thawed at room temperature for 8 hours. When the electrode specimen has an excessive amount of macro-cracks, it fractures during thawing after freezing. Conversely, when the electrode specimen has a minimal amount of macro-cracks the original shape may be maintained even during thawing after freezing.

Figure 5A:
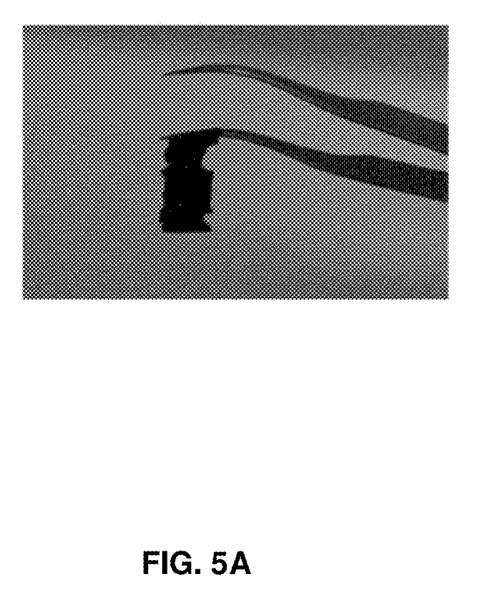
FIG. 5A shows an exemplary freezing resistance test result of the electrode specimen of Comparative Example 1 according to an exemplary embodiment of the present disclosure.
Figure 5B:
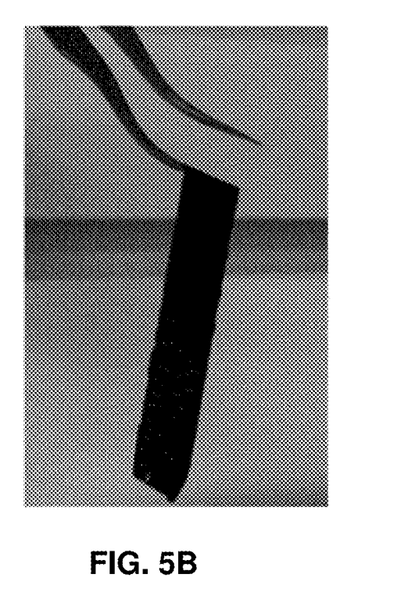
FIG. 5B shows an exemplary freezing resistance test result of the electrode specimen of Example 1 according to an exemplary embodiment of the present disclosure.
Figure 6A:
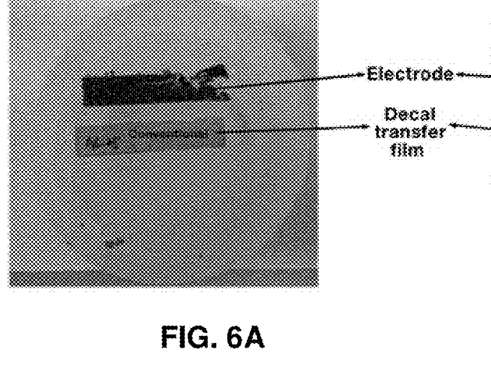
FIG. 6A shows an exemplary freezing resistance test result of the electrode specimen of Comparative Example 2 according to an exemplary embodiment of the present disclosure.
Figure 6B:
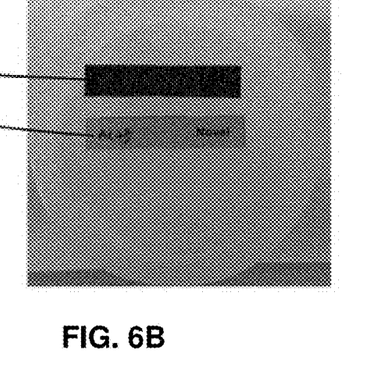
FIG. 6B shows an exemplary freezing resistance test result of the electrode specimen of Example 2 according to an exemplary embodiment of the present disclosure.

FIG. 5A shows results of Comparative Example 1 and FIG. 5B shows results of Example 1. In addition, FIG. 6A shows results of Comparative Example 2 and FIG. 6B shows results of Example 2. As shown in exemplary FIGS. 5A and 6A respectively, electrode specimens of Comparative Examples 1 and 2 may not maintain original shapes thereof and are thus crushed into small fractions. However, as shown in Examples 1 and 2, original shapes are maintained as shown in FIGS. 5B and 6B, respectively. To prove that fine pores or micro-cracks may be filled to further improve freezing resistance by further conducting heat treatment, in addition to drying like Examples 1 and 2 to inhibit formation of macro-cracks, electrode specimens were produced in accordance with the following Examples 3 to 6 and Comparative Examples 3 and 4.

EXAMPLE 3

The electrode specimen that underwent drying of Example 1 was heat-treated under vacuum conditions at about 100° C. for 1 hour.

EXAMPLE 4

The electrode specimen that underwent drying of Example 1 was heat-treated under vacuum conditions at about 120° C. for 1 hour.

EXAMPLE 5

An electrode specimen was obtained using the same composition in the same manner as in Example 1, with the exception of that the content of the ionomer binder in the dried solid-phase electrode was obtained by applying the catalytic ink to the decal transfer film and drying was adjusted to 20% by weight, when preparing the catalytic ink. The electrode specimen was then heat-treated under vacuum conditions at about 100° C. for 1 hour.

EXAMPLE 6

An electrode specimen was obtained using the same composition in the same manner as in Example 1, with the exception that the content of the ionomer binder in the dried solid-phase electrode obtained by applying the catalytic ink to the decal transfer film and drying was adjusted to 20% by weight, when preparing the catalytic ink. The electrode specimen was then heat-treated under vacuum conditions at about 120° C. for 1 hour.

COMPARATIVE EXAMPLE 3

The electrode specimen that underwent drying of Example 1 and was not subjected to heat-treatment at a high temperature was set as Comparative Example 3.

COMPARATIVE EXAMPLE 4

An electrode specimen was obtained using the same composition in the same manner as in Example 1, with the exception that the content of the ionomer binder in the solid-phase electrode obtained by applying the catalytic ink to the decal transfer film and drying the same was adjusted to 20% by weight, when preparing the catalytic ink. The electrode specimen was not subjected to high-temperature heat-treatment and set as Comparative Example 4.

TEST EXAMPLE 3

In order to prove that heat treatment at a high temperature may prevent formation of fine pores or micro-cracks on the electrode specimen, testing was conducted in the following manner using the electrode-separating device based on freezing of Test Example 2. The electrode specimen floated on the deionized water to ensure that the electrode specimen formed on the decal transfer film directly contacted the surface of the deionized water and was sufficiently soaked therein for 24 hours. Then, the electrode specimen was frozen at a temperature below zero degrees Celsius for 6 hours and was then separated from the decal transfer film.

When the electrode specimen has fine pores or micro-cracks, the water permeates more easily into the electrode specimen and the electrode specimen was frozen enough to be separated from the decal transfer film. Conversely, when the electrode specimen has a minimal amount of fine pores and micro-cracks, water permeates minimally into the electrode specimen and the electrode specimen is minimally frozen and rarely separated from the decal transfer film.

Figure 7:
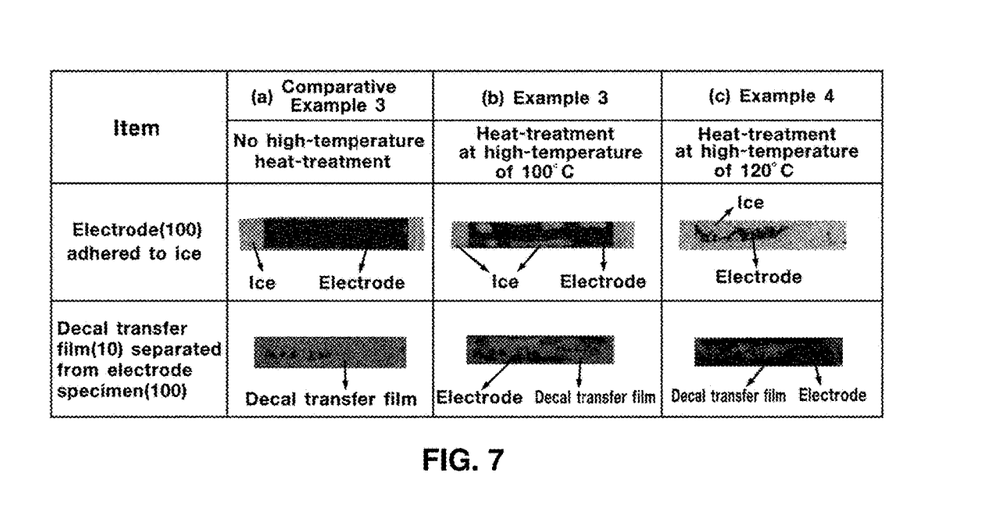
FIG. 7 shows exemplary freezing resistance test results of electrode specimens of Comparative Example 3, Example 3, and Example 4 according to an exemplary embodiment of the present disclosure.
Figure 8:
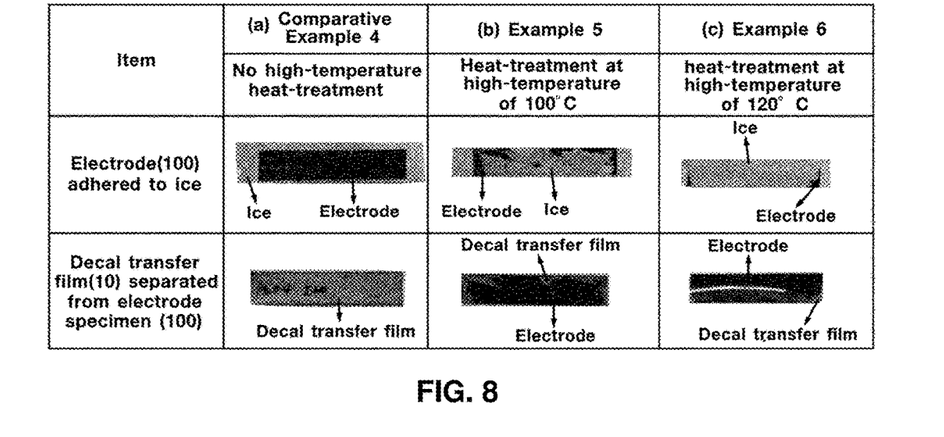
FIG. 8 shows exemplary freezing resistance test results of electrode specimens of Comparative Example 4, Example 5, and Example 6 according to an exemplary embodiment of the present disclosure.

FIG. 7 shows exemplary test results of Comparative Example 3, which illustrates the decal transfer film 10 separated from the electrode specimen 100. FIG. 7 shows exemplary test results of Example 3, which illustrates the decal transfer film 10 separated from the electrode specimen 100. FIG. 7 shows exemplary test results of Example 4 which illustrates the decal transfer film 10 separated from the electrode specimen 100. FIG. 8 shows exemplary test results of Comparative Example 4, which illustrates the decal transfer film 10 separated from the electrode specimen 100. FIG. 8 shows exemplary test results of Example 5, which illustrates the decal transfer film 10 separated from the electrode specimen 100. FIG. 8 shows exemplary test results of Example 6, which illustrates the decal transfer film 10 separated from the electrode specimen 100.

As shown in exemplary FIG. 7 for Comparative Example 3 and FIG. 8 for Comparative Example 4, the electrode specimen which is not subjected to high-temperature heat treatment is readily separated from the decal transfer film when frozen and maintains an original shape thereof. In other words, when the electrode specimen is not heat treated, some fine pores or micro-cracks are formed and water permeates into the electrode specimen.

As shown in exemplary FIG. 7 for Example 3 and Example 4 and FIG. 8 for Example 5 and Example 6, the electrode specimen subjected to high-temperature heat treatment is minimally frozen and is not readily separated from the decal transfer film. Accordingly, the fine pores or micro-cracks may be effectively filled by high-temperature heat treatment.

The present disclosure includes the configuration described above and thus has the following effects. The present disclosure provides an electrode for fuel cells which exhibits more improved freezing resistance since it reduces or removes macro-cracks and thus avoids permeation of excessive water therein. In addition, the present disclosure provides an electrode for fuel cells which exhibits more improved freezing resistance because of the lack of significant reduction of pores or micro-cracks and thus prevents formation and growth of ice. In addition, according to the present disclosure, a membrane electrode assembly may be produced without causing damage to an electrolyte membrane because high-temperature heat treatment is conducted on an electrode specimen on a decal transfer film, independent of the electrolyte membrane. Accordingly, an electrode for fuel cells with more improved freezing resistance as well as durability may be obtained.

Effects of the exemplary embodiments of the present disclosure are described for illustrative purposes and are not limited to those described above. However, it will be appreciated by those skilled in the art that modifications and alterations may be made in these examples without departing from the principles and spirit of the disclosure, the scope of which is defined in the appended claims and their equivalents.

What is claimed is:

1. A method of manufacturing an electrode for fuel cells with improved freezing resistance comprising:
    applying a catalytic ink to a decal transfer film to prepare an electrode specimen;
    primarily drying the electrode specimen at a temperature in the range of about 70° C. to about 90° C.;
    secondarily drying the electrode specimen at a temperature that is less than 70° C.; and
    heat-treating the electrode,
    wherein the heat treating is performed within a range of about 100° C. to about 125° C.

2. The method according to claim 1, wherein the catalytic ink includes a platinum catalyst supported on a carbon support (Pt/C) and an ionomer binder.

3. The method according to claim 2, wherein the ionomer binder is present in an amount within a range of about 10 wt % to 50 wt % in a dried solid-phase electrode obtained by simultaneously applying the catalytic ink to the decal transfer film and drying.

4. The method according to claim 1, wherein application of the catalytic ink to the decal transfer film is performed with that loading of the platinum catalyst in the range of about 0.01 mg-Pt/cm$^2$ to 1 mg-Pt/cm$^2$.

5. The method according to claim 1, wherein the primary drying of the electrode specimen is performed for a duration in the range of about 1 minute to 6 hours.

6. The method according to claim 1, wherein the secondary drying of the electrode specimen is performed at a temperature greater than about 0° C. and less than 70° C.

7. The method according to claim 1, wherein the primary drying and secondary drying are performed under an atmospheric pressure condition.

8. The method according to claim 1, wherein heat treatment is performed under a vacuum condition or under an inert gas atmosphere for a duration of about 10 minutes to 3 hours.

9. The method according to claim 1, wherein the decal transfer film is selected from at least one of the group consisting of poly(tetrafluoroethylene) (PTFE), poly(ethylene terephthalate) (PET), poly(butylene terephthalate) (PBT), poly(trimethylene terephthalate) (PTT), poly(ethylene naphthalate) (PEN) and polyimide (PI), and a combination thereof.

10. A method of manufacturing a membrane electrode assembly for fuel cells with improved freezing resistance comprising transferring the decal transfer film provided with the electrode specimen according to claim 1 to a plurality of surfaces of an electrolyte membrane to form a membrane electrode assembly.

* * * * *